March 9, 1926. Re. 16,282

I. LESSON

BLOOMERS

Original Filed May 28, 1923

INVENTOR

Isadore Lesson

BY

Clifford E. Dunn

ATTORNEY

Reissued Mar. 9, 1926.

Re. 16,282

UNITED STATES PATENT OFFICE.

ISADORE LESSON, OF BROOKLYN, NEW YORK.

BLOOMERS.

Original No. 1,523,379, dated January 13, 1925, Serial No. 641,996, filed May 28, 1923. Application for reissue filed October 28, 1925. Serial No. 65,500.

*To all whom it may concern:*

Be it known that I, ISADORE LESSON, also known as ISADORE L. LESAVOY, a citizen of Russia, and resident of Brooklyn, in the county of Kings and State of New York, have invented a new and useful Improvement in Bloomers; and I do hereby declare the following to be a full, clear, and exact description thereof.

My invention relates to bloomers and a method of making same.

The object of my invention is to provide a bloomer made of two pieces so cut that when sewed together down the middle to form the body and leg-portions, the rear half will have greater fullness than the front thereby giving greater freedom in sitting or when the legs are stretched, and thus relieving the strain on the crotch, and doing away with the gusset heretofore generally employed as a re-enforcement at the crotch.

Figure 1:
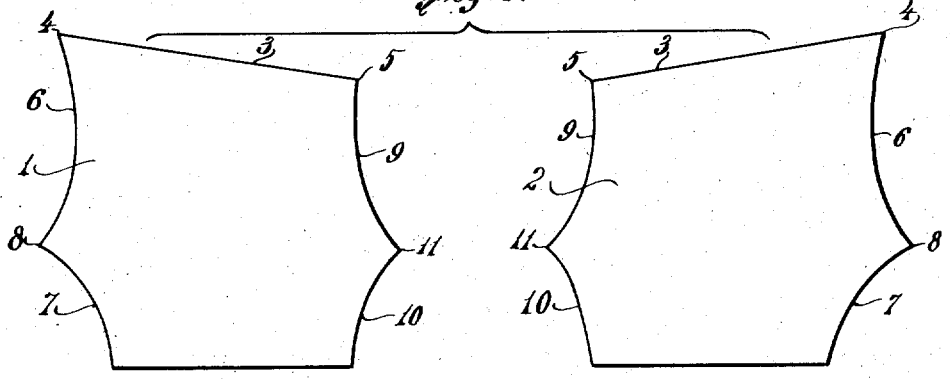
Figure 2:
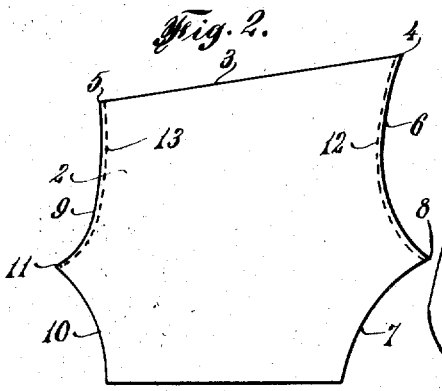
Figure 3:
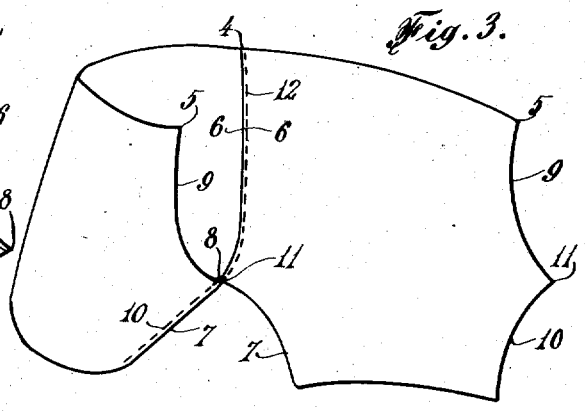
Figure 4:
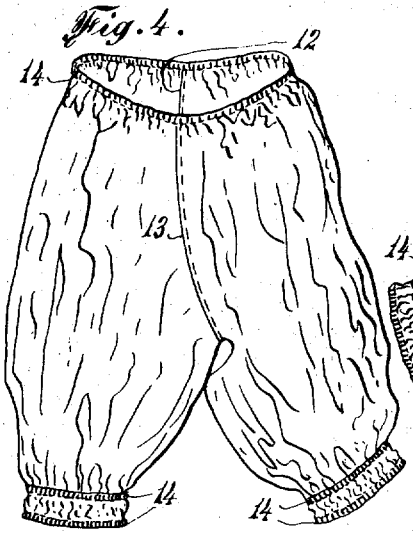

In the drawings Fig. 1 is a view of the last two sections of the material cut from the pattern from which the bloomers are made; Fig. 2 is a view of the two sections superposed and stitched along front and back; Fig. 3 is a perspective view showing the rear stitched and one leg, the other section remaining flat; Fig. 4 is a perspective view of the bloomers, and Fig. 5 is a like view of the position of the bloomers with the legs stretched.

The sections of material 1 and 2 are cut from a pattern, the top edges 3 being inclined downwardly from the rear corner 4 to the front corner 5. The rear edge has the upper curved portions 6 which merges with the lower curved portion 7 at the point 8, said upper curve 6 being longer than the lower curve 7. At the front edge there are the curved portions 9 and 10 merging at the front 11, the upper curve 9 being likewise longer than the lower To form the bloomers the sections 1 and 2 of material are brought together and sewed along the rear curved edges 6 forming the seam 12 at the middle of the bloomers in the rear. The section 1 is then folded over and the lower curved edges 7 and 10 are sewed together to form one of the legs, as shown in Fig. 3. The edges 9 are then sewed together to form the front seam 13 at the middle of the bloomers and in line with the rear seam 12. The second leg is finished by sewing together the two edges 7 and 10 of section 2.

To complete the bloomers the usual elastics 14 are employed at the waist line and at the legs. When made up in the above manner from the sections cut as above the rear seam 12 will be longer than the front seam 13, as clearly indicated in Figs. 4 and 5, thereby giving more material in the seat for giving greater freedom for that part of the anatomy covered thereby, while at the same time permitting of the legs being stretched to the position shown in Fig. 5 without undue strain at the crotch, so that no gusset-piece is required at that point.

Figure 5:
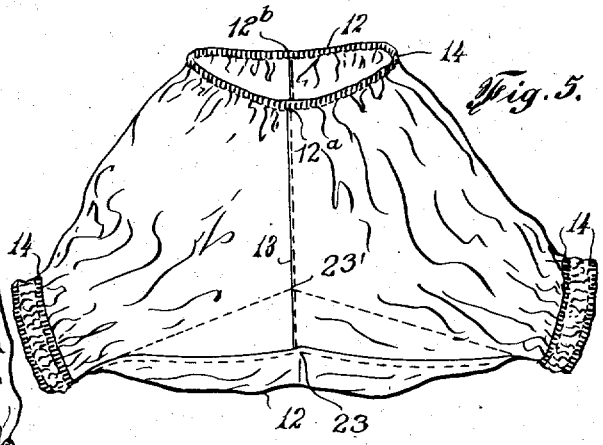

As will appear from Fig. 5 the rear upper sections are of such length that the seam 12 joining them will extend beyond the crotch line to the front of the body of the wearer and the front seam 13 is considerably shorter than the distance from the waistline to the crotch line. This arrangement not only removes some of the seams from the crotch line but provides a fullness at such line and a capacity to yield under stresses, as when the bloomers are extended as shown in Fig. 5, which yielding capacity would not be possible if the cross seam which is practically unyielding, were directly at the crotch line.

My improved bloomers give stout people comfort, ease of movement and freedom from chafing, while those who indulge in athletics or dancing have greater freedom of movement, and all without liability of tearing at the crotch.

As there are only two pieces composing the bloomers the amount of sewing required is reduced to a minimum and the cost of manufacture greatly reduced, and, further, there is a saving in material.

It should be pointed out that there may be other shapes of the four edge portions 6, 7, 9 and 10 than those shown, and yet the real advantages of the invention preserved, provided the new bloomer garment is made of two substantially identical substantially six-sided pieces having the edge portions 6 and 9, the top edge 3, and the straight line joining the points 8—11, of each piece, of the relative lengths defined in the appended claims; thereby not only to cause the throwing forward of the point of seam intersection 23 shown in Fig. 5 to the point 23′, when the bloomer waist opening is arranged on the wearer with the points 12ᵃ and 12ᵇ in the same horizontal plane, but also to provide, in the seat material on opposite sides of the crotch-seam and in rear of the point 23′, a certain "lack of fullness," as it may be termed. This lack of fullness really amounts to the taking out of a dart from the seat portion of such a bloomer, for instance, as that shown in the United States patent to Dolan No. 1,513,750; and this lack of fullness must be such that when a strain in a cross-crotch-wise direction is made upon the leg portions, such strain will be absorbed by unstitched portions of the fabric, so that the leg-seams and particularly the point of seam intersection 23, will be largely relieved of said strain; as otherwise, of course, the throwing of the point of seam-intersection forward, according to the invention, would not be instrumental in doing the very thing intended, which is to remove said point from the strain of a cross-crotch pull. That is to say, if the lack of fullness defined is not present, the stress of the pull cannot go any where else than to the leg-seams, and consequently such stress will run up along both leg-seams to act disruptively at the point of seam-intersection despite the throwing forward of the latter.

In other words, the present bloomer invention, considered most broadly, that is, aside from the preferred embodiment shown in the drawing, has nothing to do with the curved shapes of the edges 6, 7, 9 and 10, although it is desirable, if not essential, that in all embodiments the upper rear edge 6 be curved; as otherwise the line 8—11 would have to be even longer than as shown in the drawing, and to such an extent as to make the bloomer wasteful of material and "bunchy" in fit. Consequently, it is very much preferred to curve said edge 6 whether or not the other edges 7, 9 and 11 be made straight. Nor will a concave curving of the edge 6 destroy the essential "lack of fullness" aforesaid. Indeed, quite the contrary; which is another reason why it is preferred thus to curve said edge 6.

What I claim is:

1. A bloomer made of two approximately hexagonal pieces of material each cut with the top edge sloping to the front edge, the top edge of each piece being considerably longer than required to half-gird the waist of the wearer, the rear edge of each piece having upper and lower edge portions meeting at a point, and the front edge of each piece also having upper and lower edge portions meeting at a point, such two points being spaced apart a distance at least equal to the length of the top edge, the upper rear edge portion being shaped to define a concave curve and having a length greater than the upper front edge portion; the pieces being stitched together by joining, two by two, the curved edge portions of both pieces, the upper front edge portions of both pieces, the lower edge portions of one piece, and the lower edge portions of the other piece; the upper curved portions being of such length that the seam joining them extends beneath and to the front of the body of the wearer and the upper front edge portions of said sections being of such length that when joined their seam is materially shorter than the normal distance from the waist line to the crotch line of the wearer.

2. A bloomer made of two pieces of material, each cut with the top edge sloping to the front edge, the rear edge of each of said pieces having two curved portions meeting at a point, the upper longer than the lower and of concave form, the front edge having curved portions meeting at a point, the upper of less length than the upper curve on the rear edge, said pieces being united along said curved portions, the upper rear curved portions of said sections being of such length that the seam joining them extends beneath and to the front of the body of the wearer and the upper front curved portions of said sections being of such length that when joined their seam is materially shorter than the normal distance from the waistline to the crotch line of the wearer.

ISADORE LESSON.